United States Patent [19]
Pelletier

[11] 3,783,924
[45] Jan. 8, 1974

[54] REPLACEMENT TREAD BAND FOR RETREADING A WORN TIRE

[75] Inventor: Guy Pelletier, Ville d'Anjou, Quebec, Canada

[73] Assignee: Rockland Industries Ltd., Kingsbury, Quebec, Canada

[22] Filed: Feb. 7, 1972

[21] Appl. No.: 224,001

[52] U.S. Cl. ......... 152/330, 156/128 R, 152/361 R, 152/170
[51] Int. Cl. .............................................. B60c 9/18
[58] Field of Search .................. 152/170, 176, 187, 152/229, 361, 330; 156/96, 98, 128, 129 R, 129 T, 130

[56] References Cited
UNITED STATES PATENTS

| | | | |
|---|---|---|---|
| 3,557,858 | 1/1971 | Lugli | 152/361 |
| 3,218,209 | 11/1965 | Travers et al. | 156/123 |
| 1,965,073 | 7/1934 | Ginsberg | 156/96 |

FOREIGN PATENTS OR APPLICATIONS

| | | | |
|---|---|---|---|
| 769,258 | 3/1957 | Great Britain | 152/209 R |
| 1,210,348 | 2/1966 | Germany | 152/187 |

*Primary Examiner*—Gerald M. Forlenza
*Assistant Examiner*—Robert Saifer
*Attorney*—Roberts B. Larson et al.

[57] ABSTRACT

A replacement tread band for retreading a worn tire including a band of vulcanized rubber having the width of the tread band of a worn tire, cords embedded longitudinally into the band of vulcanized rubber and having opposite ends arranged to overlap longitudinally of the replacement tread band of a worn tire and to be secured one to another, then forming a reinforcement ring acting against separation of the band of vulcanized rubber from the tire under action of the centrifugal force. The opposite end portions of the band of vulvanized rubber are provided with cutouts adapted to lodge said ends of said cords and an elastomeric material to secure said ends together.

4 Claims, 5 Drawing Figures

REPLACEMENT TREAD BAND FOR RETREADING A WORN TIRE

The present invention relates to the retreading of tires and, more particularly, to a replacement tread band for retreading a worn tire.

It is known to retread a worn tire using a prevulcanized replacement tread band which is adhered, by hot or cold treatment, to the worn tread portion of a used tire after appropriate preparation of the surface of the worn tread portion.

The Canadian Pat. Nos. 562,232 granted on Aug. 26, 1958 and 554,888 granted on Mar. 25, 1958 describes retreading methods using a preformed and prevulcanized replacement tread band.

However, despite the care taken to ensure a good adherence of the new tread band to the worn tire, the above methods, as the conventional method consisting in vulcanizing the replacement band in situ onto the worn tire, result in premature separation, partial or complete, of the replacement tread band.

In the presently known systems or constructions, the replacement tread bands have no reinforcement ply inside the mass of rubber. To counteract separation of the replacement tread band from the tire caused by the action of the centrifugal force upon rotation of the tire, the only recourse has been to provide a strong adherence of the replacement band.

In the construction according to the invention, even if the adherence is not optimized, longitudinal cords are embedded into the band of rubber to positively prevent the above separation, even when the tire rotates at high speed.

It is a general object of the invention to provide retreaded tires wherein the new tread band practically never separates and, consequently, such tires have a life practically equal to the life of a new tire.

It is another general object of the invention to provide a retreaded tire that performs like a new tire at high speeds of rotation on a supporting surface.

It is another object of the invention to produce a replacement tread band specifically conceived to avoid the separation of the band of rubber under the action of the centrifugal force thereon.

It is another more specific object of the invention to provide a replacement tread band with cords embedded into the mass of rubber of the band and arranged whereby to avoid separation of the latter under action of the centrifugal force.

It is another specific object of the invention to provide a prevulcanized band of rubber which covers only the width of the tread portion of a worn tire, which wraps around the latter and wherein reinforcement cords extend along the full length of the band of rubber and has opposite ends which overlap at the ends of the latter band, whereby to form a reinforcing ring completely embedded into the mass of rubber.

It is still a further object of the invention to provide retreaded tires which are constructed and arranged to give a visual indication when the new tread portion has sufficiently been worn to be replaced before damaging the tire.

The preceding objects and other objects and advantages of the invention will be better understood by referring to the following description and to the appended drawings, which illustrate a preferred embodiments of the invention, by way of example only, and in which.

In the appended drawings, the same reference numerals indicate the same elements.

Figure 1:
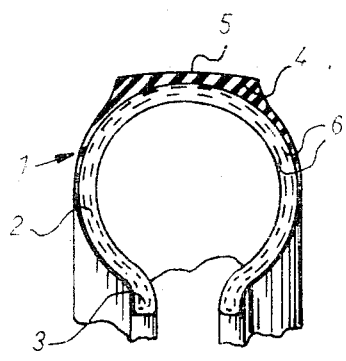
FIG. 1 is a cross-sectional view of a portion of a worn tire, the tread portion of which has been prepared to receive a replacement tread band.
Figure 2:
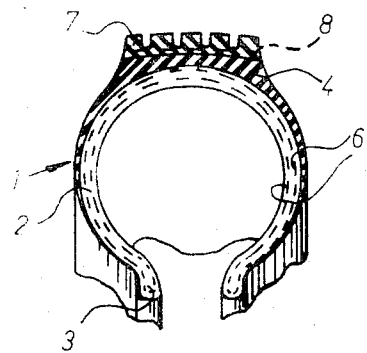
FIG. 2 is a cross-sectional view of the same worn tire provided with a replacement tread band according to the invention.

FIG. 1 shows a worn tire 1, of conventional construction, formed of a carcass 2 defining beads 3, a tread portion 4 having a peripheral surface 5, the tread portion 4 having a worn external surface. The carcass 2 is provided with conventional plies 6, embodied into the mass of vulcanized rubber or other elastomer. The plies 6 may be formed of longitudinal cords or canvas of cotton or of synthetic or metallic fibers, as is well known in the trade of tire manufacturing.

The peripheral surface 5 is buffed and cleaned before mounting thereon the replacement tread portion according to the invention which includes a band of vulcanized rubber 7, 7'. The latter is fixed against the peripheral surface 5 by a cement or adhesive which cures either under cold or heat treatment, for example by vulcanizing the band of rubber to the surface 5.

According to an essential feature of the present invention, the band of rubber 7 or 7' surrounds one or several plies 8,8' which have a large resistance in tension and which are embedded and adhered into the band 7,7' and arranged to form a reinforcing ring. The latter prevents the separation of the band 7 or 7' from the tire 1 by opposing the action of the centrifugal force thereon, since it is well known that the above separation is mostly caused by the centrifugal force.

Figure 4:
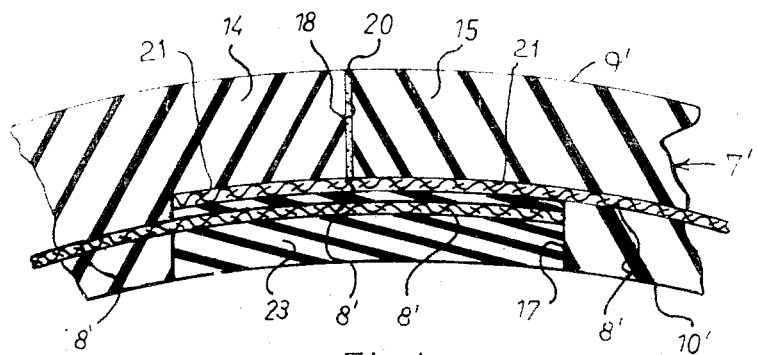
FIG. 4 is a partial longitudinal cross-section of a preferred embodiment of a replacement tread band according to the invention, showing the joint of the opposite ends of the band of rubber and of the longitudinal cords.

FIG. 4 shows a preferred embodiment of the replacement tread band according to the invention.

Figure 3:
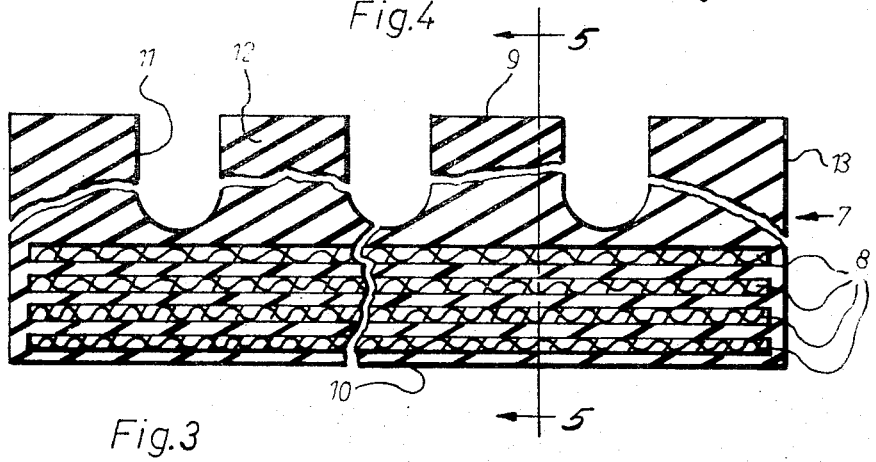
FIG. 3 is a partial view in cross-section of a replacement tread band according to the invention.
Figure 5:
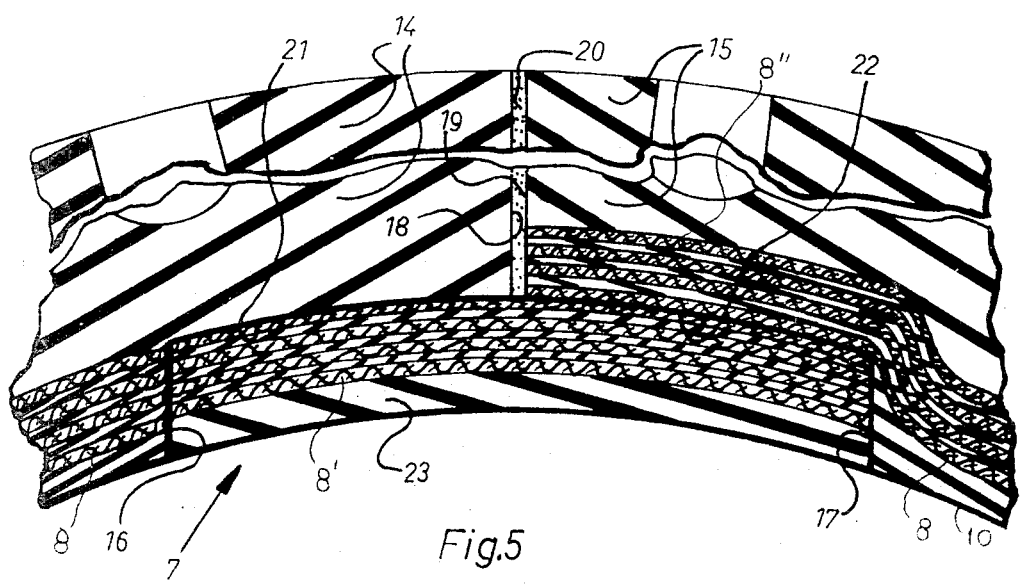
FIG. 5 is a partial, longitudinal cross-sectional view taken along line 5—5 of FIG. 3.

The replacement tread band of FIGS. 3 and 4 includes a band of rubber 7 or 7' or of another elastomer. The latter band is vulcanized, of general even thickness, and defines a main external surface 9 or 9' and a substantially smooth main internal surface 10 or 10' arranged to be adhered to the peripheral surface 5 of the tread portion of a worn tire 1. The external surface 9 or 9' includes conventional grooves 11 formed therein and defining traction treads 12, of any usual form or design.

The plies 8, 8' are preferably formed only of cords extending longitudinally, in transverse spaced-apart relationship, along the full length of the band of rubber 7 or 7'. The longitudinal cords may, however, form part of a canvas or fabric of cotton, metal filaments or synthetic fibers. The plies 8 or 8' may vary in number and four plies are shown in FIG. 3, although a single ply formed of the above laterally spaced-apart and longitudinally extending cords is preferred, as shown in FIG. 4. Each ply is of relatively fine and flexible cords which do not limit the flexibility of the bands of vulcanized rubber 7 and 7'.

The plies 8, 8' are arranged parallel to the internal surface 10, 10', near the latter and extend on relatively the full width and the complete length of the bands of rubber 7, 7', preferably inwardly relative to the sides 13 of the latter.

The opposite ends of each ply 8 or 8' overlap one another longitudinally such as to be fixed one relative to the other to form a firm joint completing a reinforcement ring embedded into the mass of rubber of the corresponding band 7 or 7'. The outermost ply in each band of rubber is preferably equally distant of the main internal surface 10 or 10' and of the bottom of the grooves 11 respectively.

The mass of rubber or other elastomer passes through the spaces between the spaced-apart longitudinal cords of the plies 8,8. Therefore, the mass of rubber or other elastomer is firmly adhered to the longitudinal cords.

The cords forming the plies are preferably very thin, for example between 50 thousandths and one fiftieth of an inch, for the ordinary tires, but may obviously be bigger for larger tires.

For a band of rubber having a thickness varying between one-half and 4 inches, the plies or longitudinal cords inside the mass of rubber should have a thickness varying approximately between one-tenth and eight-tenths of an inch in order to maintain the natural flexibility of the replacement tread band.

The band of rubber 7 or 7' is made of the same width as the peripheral surface 5 of the tread portion of the tire to be retreaded.

The band of rubber 7, 7' may be made without joint, that is of appropriate annular form, and in that case, the longitudinal cords are arranged such as to overlap at their ends. The band 7, 7' may also be molded with the shape of a band, the ends of which must thereafter be joined to form a ring. The joint must be sufficiently strong. FIG. 4 shows a preferred embodiment of such joint of a band of rubber 7' embedding a single ply 8'.

In this FIG. 4, the reference numerals 14 and 15 show the outer end portions of a band 7', made of vulcanized rubber or elastomer, the external surface 9' of which is provided with grooves and ridges, not shown, and the internal surface 10' is relatively smooth and planar. The outer end portions 14 and 15 define shoulders 17 on the internal surface 10 within the end faces 18; therefore, the portion between the shoulders and the end faces is of reduced thickness to form internally recessed surfaces 21.

The joint is made by engagement of the longitudinal cords of the ply 8' at opposite ends of the band of rubber 7', whereby the longitudinal cords extend freely along the internally recessed surface 21 and protrude farther than the corresponding end face 18. Both outer end portions 14 and 15 of the hand 7' are joined to form an annular band. The end faces 18 are coated with an adhesive or cement 20, which is compatible with rubber or the other elastomer and that cures either at normal temperature or under heat; the end faces 18 are fixed and adhered end to end and the free ends of the longitudinal cords are caused to overlap in the cutout defined intermediate both shoulders 17 and a piece of rubber 23 is vulcanized in the space between the two shoulders 17, so as to firmly adhere the piece of rubber 23 to the outer end portions 14 and 15, and to effectively embed the above free ends into the piece of rubber 23. A strongly resistant joint is thus obtained, since the ends of the longitudinal cords overlap each other and the piece of rubber 23, used to make the joints, adheres to both outer end portions 14 and 15 of the band of rubber 7'. The replacement tread portion so obtained and which has the shape of a ring, or else the annular replacement tread band made without joint in the mass of rubber, as indicated above, may be applied to the peripheral surface 5 of a worn tire 1.

It will be understood that the plies 8, 8' are preferably made only of independent cords arranged longitudinally side by side but spaced from each other into the band of rubber 7 or 7'.

The ply 8' is preferably made with white cords or cords of any contrasting color compared to the mass of rubber of the band 7'. Thereby, those cords of contrasting color become visible before the retreaded tire becomes excessively worn and the carcass of the tire becomes damaged. This allows to notice the wear and to effect another retreading when necessary.

Even if a preferred embodiment of the invention has been illustrated and described, it is to be understood that modifications may be made without departing from the spirit and scope of the appended claims.

I claim:

1. A replacement tread band for retreading a worn tire comprising a band of vulcanized rubber having the width of the tread portion of a worn tire and defining a first main surface provided with tread grooves and adapted to contact the ground and a second main surface smooth and substantially planar adapted to contact the tread portion of a worn tire, and strongly resistant tension cords embedded in, and adhering to the mass of vulcanized rubber of said band extending longitudinally the full length of said band of vulcanized rubber and having opposite ends arranged to overlap each other longitudinally of the tread portion of the worn tire and to be fixed relative to each other to form a reinforcement ring into said mass of rubber and resisting separation of said tread band from the worn tire.

2. A replacement tread band as defined in claim 1, wherein the band of vulcanized rubber has two opposite end portions each provided with a cutout into the smooth second main surface and forming a shoulder, and said ends of said cords extend outwardly of said shoulders into said cutouts.

3. A replacement tread band as defined in claim 2, wherein said band of vulcanized rubber forms a ring with said opposite end protions engaging end to end and said cutouts meeting and forming a cavity in which are located said opposite ends of said cords and an elastomeric substance filling said cavity and bonding said opposite ends to each other in an overlapping relationship.

4. A replacement tread band as defined in claim 3, wherein at least some of said cords are of contrasting color relative to the color of the band of vulcanized rubber and are placed near said second main surface, whereby to become visible when the wear reaches said cords of contrasting color.

* * * * *